United States Patent

[11] 3,556,191

[72] Inventor Iain C. Mills
Birmingham, England
[21] Appl. No. 711,653
[22] Filed Mar. 8, 1968
[45] Patented Jan. 19, 1971
[73] Assignee The Dunlop Company Limited
London, England
a British company
[32] Priority Mar. 17, 1967
[33] Great Britain
[31] 12616/67

[54] PNEUMATIC TIRES
15 Claims, 4 Drawing Figs.
[52] U.S. Cl. .................................................. 152/209
[51] Int. Cl. .................................................. B60c 11/06
[50] Field of Search .................................................. 152/209

[56] References Cited
UNITED STATES PATENTS
2,155,972 4/1939 Hower.......................... 152/209
3,094,157 6/1963 Klohn........................... 152/209
3,405,753 10/1968 Verdier......................... 152/209
FOREIGN PATENTS
281,457 12/1927 Great Britain................. 152/209
546,975 8/1942 Great Britain................. 152/209

Primary Examiner—Arthur L. La Point
Attorney—Stevens, Davis, Miller & Mosher

ABSTRACT: A tread pattern for a low squat (wide oval) pneumatic tire to assist in the rapid removal of water from the contact area of the tire tread on the road surface comprising a series of zigzag grooves arranged such that the various parameters associated with water flow capacity (drainage) e.g. rib width, groove width etc. provide progressively decreased capacity from the midcircumferential plane to the shoulder of the tire.

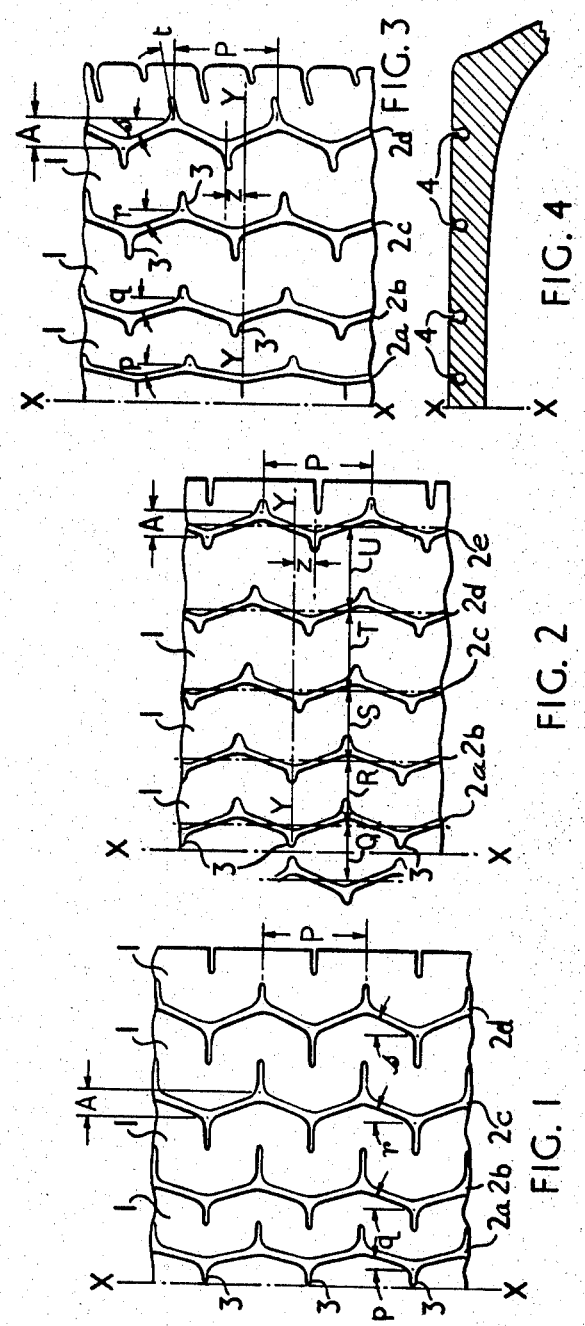

PNEUMATIC TIRES

This invention relates to pneumatic tires.

The operation of pneumatic tires in wet conditions requires the rapid removal of water from between the contact area of the tire tread and the road. That water which is not bodily displaced by the bulk of the tire in the form of a bulk "bow wave" displacement as it rolls along the ground, can at least partly be drained into grooves or slots formed in the tire tread. The most difficult area for drainage is that which is nearest the center of the contact area, at any given time, since the water which tends to be trapped between the tire and the road in this region has the greatest distance to travel to be thrown clear in bulk from the contact area.

It is an object of the invention to produce a pneumatic tire wherein the tread drainage conditions are improved in the and around the center of the contact area.

A pneumatic tire comprising a tread portion provided with a plurality of generally circumferential grooves and ribs wherein the ratio of the water flow drainage capacity of the generally circumferential grooves of the tire to the mean axial spacing of the grooves to one side of a groove between the said groove and an adjacent groove progressively decreases from the groove nearest the midcircumferential line to a groove adjacent a shoulder of the tire.

The aforementioned ratio may also decrease progressively from the grooves on each side of the midcircumferential line nearest but not coincident with the midcircumferential line to the groove adjacent to each shoulder of the tire.

By "water flow drainage capacity" of the generally circumferential grooves is meant the capacity of those grooves to accept water from the road during running of the tire and enable it to be drained along the grooves eventually to be ejected by the rotating tire and the capacity may be inherent in the groove by virtue, for example, of its width, its depth or its relatively linear form. The unit length of ground-contacting area between grooves may increase from that area nearest the midcircumferential line to a corresponding area adjacent to the shoulder.

According to a first form of the invention a pneumatic tire comprises a tread portion provided with a plurality of generally circumferential grooves and ribs the lateral distance between grooves increasing progressively from the distance between grooves nearest the mid circumferential plane to the distance between grooves nearest a shoulder of the tire.

According to a second form of the invention a pneumatic tire comprises a tread portion with a plurality of generally circumferential grooves and ribs, the transverse cross-sectional area of the grooves decreasing progressively from the groove nearest the midcircumferential plane to the groove nearest a shoulder of the tire.

In one arrangement according to the second form of the invention, the width of the grooves measured at the surface decreases progressively from the groove nearest the midcircumferential plane to the groove nearest a shoulder of the tire.

In another arrangement according to the second form of the invention, the depth of the grooves decreases progressively from the groove nearest the midcircumferential plane to the groove nearest a shoulder of the tire.

According to a third form of the invention a pneumatic tire comprises a tread portion provided with a plurality of undulating or similarly arranged generally circumferential grooves. A specific form of undulating groove useful in the invention is the zigzag groove, the angle of inclination of the limbs of the zigzag grooves or the general angle of the corresponding undulating or similarly arranged groove being progressively greater from the groove nearest the midcircumferential plane to the groove nearest a shoulder of a tire.

In one arrangement according to the third form of the invention, the amplitude of the zigzag, undulating or similarly disposed grooves progressively increases from the groove nearest the midcircumferential plane to the groove nearest the shoulder of the tire.

In combination with any of the aforementioned forms of the invention, a pneumatic tire may also be provided with a plurality of zigzag undulating or similarly arranged generally circumferential grooves, the circumferential offset of the peaks of undulation in the grooves relative to the groove nearest the midcircumferential plane of the tire progressively increases, the minimum circumferential offset being that between the groove nearest the midcircumferential plane of the tire and its axially outer immediate neighbor, the maximum circumferential offset being that between the groove nearest the midcircumferential plane of the tire and the groove at a shoulder of the tire.

Each groove may be constructed with a transverse cross section, the area of which is greater in the region near the base than in the region near the tread surface.

The forms of the in invention just defined may be effectively employed in what is known as "squat" cross section tires, i.e. tires in which the proportion of depth (bead-base to peak of crown of the tire) to overall width of the tire is low, say 0.4 to 0.6 compared with a more customary high proportion, e.g. 0.8 or "nonsquat."

The forms of the invention just defined may be employed separately or two or more together, e.g. on squat tires, to obtain an improved water drainage.

The progressive increase or decrease in any of the previously defined forms of the invention may be according to a logarithmic progression, e.g. a log progression taken to the base 10.

Embodiments of the invention will now be described by way of example with reference to the accompanying drawings wherein:

FIG. 1 is a fragmentary plan half-view of a tire tread illustrating variation in the rib width and amplitude of the zigzag grooves axially of the tread;

FIG. 2 is a fragmentary plan half-view of a tire tread illustrating variation in rib width and circumferential offset of the grooves;

FIG. 3 is a fragmentary plan and half-view of a tire tread illustrating variation in rib width, circumferential offset of the grooves, and inclination of the groove side arm and also the radial variation in width of the groove;

FIG. 4 is a sectional half view of a tire and illustrates a modification in groove profile to the tire shown in FIG. 3.

It should be noted that the half-view of the tire treads shown in FIGS. 1, 2, 3 and 4 not illustrated are mirror images of the half views illustrated.

The tires are for use in motor car racing and are provided with squat cross sections, the degree of squatness being approximately 0.4, as previously defined. The tires are approximately 10½ inches wide in the contact area of the tread and fit upon a 15 inch diameter bead-base wheel. The tires are each capable of carrying a static load of 3½ cwts. and up to 6 cwts. upon load transfer during braking or acceleration. It will thus be appreciated that the tires have very wide treads for their size and consequently the circumferential extent of the contact area of each tire compared with its width is small when compared with conventionally designed tires. In addition the tires are comparatively lightly loaded.

In a first embodiment of the invention shown in FIG. 1, the tire is provided with eight generally circumferential grooves 2 of zigzag form, symmetrically disposed about the midcircumferential plane X-X. Each of the limbs of the zigzag in the grooves 2a nearest the midcircumferential plane X-X is inclined at only a very small angle $p$ with respect to a circumferential line; the angles of inclination $q$, $r$, $s$ of the limbs of the zigzags in successive grooves 2b, 2c and 2d increasing from one groove to the next progressively so that the final groove 2d adjacent to each shoulder is made up of limbs which are comparatively steeply inclined with respect to a circumferential line. This steeper inclination, since the pitch (designated in FIG. 1 by the reference letter P) of the zigzags for each groove is retained constant, enables a progressively wider amplitude (designated in FIG. 1 by the reference letter A) of the zigzag form to be used as one considers, successively, grooves from the one 2a nearest the midcircumferential plane X-X to the grooves 2b and 2c and terminating at the grooves 2d nearest the shoulders.

In addition the axial spacing of the grooves (i.e. the widths of the ribs 1) progressively increases from a close spacing adjacent to the midcircumferential plane X-X to a comparatively wide spacing adjacent to the tire shoulders.

Each groove is provided with substantially axially-extending side grooves 3 of substantially the same width as the zigzag groove. Each side groove 3 joins each zigzag groove at every junction between the limbs of the zigzag groove and extends in an axial direction.

The length of the side grooves progressively increase with the increase in rib width described above and are so arranged so that those circumferential planes which do not intersect with a circumferential zigzag groove 2 will intersect with at least one set of side grooves associated with a circumferential rib, in some instances will intersect with side grooves from two adjacent circumferential ribs.

In a modification of the first embodiment (not illustrated) the widths of the grooves become progressively narrower the grooves of widest extent 2a being nearest the midcircumferential plane X-X the grooves of narrowest extent 2d being nearest the shoulders of the tire.

In a second embodiment of the invention illustrated in FIG. 2, the tire is provided with ten generally circumferential grooves 2a, 2b, 2c, 2d and 2e symmetrically disposed about the midcircumferential plane of the tire X-X. Each of the limbs of the zigzags in each of the grooves is arranged at a fixed angle with respect to a circumferential line. In addition, the pitch P of the zigzag grooves 2a, 2b, 2c, 2d and 2e is substantially constant. Thus the amplitude A of each of the zigzag grooves is also constant.

The axial spacing of the grooves 2a, 2b, 2c, 2d and 2e (i.e. the widths of the ribs 1) progressively increases from a close spacing adjacent the midcircumferential plane X-X to a comparatively wider spacing adjacent to the tire shoulders.

In addition, the circumferential offset $z$ of successive grooves in respect to an axially drawn line Y-Y of the side grooves 3 progressively increases from the grooves 2a adjacent the midcircumferential plane of the tire to the grooves 2e at the shoulder of the tire.

In a first modification of the second embodiment of the invention each groove is provided with substantially axially extending side grooves 3 of substantially the same width as the zigzag grooves 2. Each side groove 3 joins each zigzag groove 2 at each junction between the limbs of the zigzag groove, and extends in a general direction defined by the arrowhead shape of the two limbs adjacent the side grooves as shown in FIG. 1.

In a second modification of the second embodiment (not illustrated) the widths of the grooves become progressively narrower the grooves of widest extent 2a being nearest the midcircumferential plane X-X the grooves of narrowest extent 2e being nearest the shoulder of the tire.

In a third embodiment of the invention shown in FIG. 3, the tire is provided with eight generally circumferential substantially parallel-sided grooves of zigzag form symmetrically disposed about the midcircumferential plane X-X. Each of the limbs of the zigzag in the groove 2a nearest the midcircumferential plane X-X is inclined at only a very small angle $p$ with respect to a circumferential line, the angles of inclination $q$, $r$, $s$ of the limbs of the zigzags in successive grooves 2b, 2c and 2d increasing from one groove to the next progressively so that the final groove 2d adjacent to each shoulder is made up of limbs which are comparatively steeply inclined with respect to a circumferential line. This steeper inclination, since the pitch P is retained constant, enables a progressively wider amplitude A of the zigzag form to be used as successive grooves are considered starting from the ones 2a adjacent the midcircumferential plane X-X through the intermediate grooves 2b and 2c and terminating at the grooves 2d adjacent the shoulders.

In addition the axial spacing of the grooves (i.e. the widths of the ribs 1) progressively increases from a close spacing adjacent the midcircumferential plane X-X to a comparatively wide spacing adjacent to the tire shoulder.

The circumferential offset $z$ in respect to an axially drawn line Y-Y of the side grooves in successive grooves from the grooves 2a adjacent the midcircumferential plane X-X progressively increases from the groove 2b nearest the groove 2a adjacent the midcircumferential plane of the tire to the grooves 2d at the shoulder of the tire.

Each groove is provided with side grooves 3 of substantially the same width as the zigzag groove. Each side groove 3 joins each zigzag groove at each junction between the limbs of the zigzag groove and extends in a direction approximately as defined by the arrowhead shape of the two limbs adjacent the side groove. However, the angles $t$ of the side grooves measured with respect to an axial line, progressively increase from the side grooves 3 associated with the grooves 2a to those associated with the grooves 2d.

In a first modification (shown in FIG. 4) of the third embodiment, the tire just described is provided with circumferential grooves 4 which are constructed with a bulbous base so as to have a transverse cross section the area of which is greater in the region near the base than in the region near the tread surface.

In a second modification of the third embodiment (not illustrated) the width of the grooves become progressively narrower, the grooves of widest extent 2a being nearest the midcircumferential plane X-X and the grooves of narrowest extent 2d being nearest the shoulder of the tire.

In order to illustrate pictorially the progressive decrease in the ratio of the water flow drainage capacity of the generally circumferential grooves of the tire to the mean axial spacing of the grooves to one side of a groove between the said groove and an adjacent groove, reference is made to FIG. 2. The capital reference letters Q, R, S, T and U represent the mean axial spacing of the grooves. The largest ratio is then that of the water flow drainage capacity of groove 2a to the axial spacing Q. The smallest ratio is that of the water flow drainage capacity of groove 2e to the axial spacing U, successive intermediate grooves making up the intermediate members of the progression.

In a modification of any of the three embodiments of the invention the aforementioned factors described affecting water flow capacity of the tread i.e. rib width, circumferential groove width, circumferential groove amplitude, circumferential groove angle, groove depth, circumferential offset, side groove length, side groove inclination, hereinafter described as the water flow capacity parameters, may be arranged to follow a logarithmic progressive e.g. log to the base 10 may be utilized. Such progressions are illustrated by the following table:

| A Tire size | 550/1,360-15 | | |
|---|---|---|---|
| Type and number of grooves | 7 zig-zag circumferentially extending grooves. Constant pitch 1.416″. Constant groove width 0.15″. | | |
| Groove No. | 1 | 2 | 3 |
| Groove angle | 20° | 27° | 30° |
| Mean lateral displacement of groove from mid-circumferential plane | 1.0″ | 2.4″ | 4.4″ |

| Tire | 450/1,160-15 | | |
|---|---|---|---|
| Type and number of grooves | 6 zig-zag circumferentially extending grooves. Constant pitch 1.344″ Constant groove width 0.10″ | | |
| Groove No. | 1 | 2 | 3 |
| Groove Angle | 10° | 18° | 27° |
| Mean lateral displacement of groove from mid-circumferential plane | 0.60″ | 1.65″ | 3.20″ |

It should be noted that groove number is decided by numbering the groove nearest, but not coincident with, the midcircumferential plane of the tire as number 1 and numbering other grooves on the same side of the tread with respect to the midcircumferential plane, in their numerical order axially outwardly of groove 1.

I claim:

1. A pneumatic tire comprising a tread portion provided with a plurality of undulating generally circumferential grooves and ribs; the configuration of the undulations varying progressively in each direction laterally from the groove nearest the midcircumferential line of the tire to the grooves adjacent to the shoulders of the tire to reduce progressively from the center of the tread to the shoulders of the tire the freedom of water flow through the grooves whereby the ratio of the water flow drainage capacity of the generally circumferential grooves of the tire to the mean axial spacing of the grooves to one side of a groove between the said groove and an adjacent groove progressively decreases from the groove nearest the midcircumferential line to the grooves adjacent to the shoulders of the tire.

2. A pneumatic tire according to claim 1 wherein the axial distance between the grooves increases progressively from the distance between the grooves nearest the midcircumferential plane to the distance between the grooves nearest a shoulder of the tire.

3. A pneumatic tire according to claim 1 wherein the general angle of inclination of the corresponding undulating groove with respect to a circumferential line becomes progressively greater from the groove nearest the midcircumferential plane to the groove nearest a shoulder of a tire.

4. A pneumatic tire according to claim 1 wherein the amplitude of the undulating grooves progressively increases from the groove nearest the midcircumferential plane to the groove nearest the shoulder of the tire.

5. A pneumatic tire according to claim 1 wherein the circumferential offset of the peaks of the undulating grooves progressively increases from a groove adjacent the midcircumferential plane to the groove nearest to a shoulder of the tire.

6. A pneumatic tire according to claim 5 wherein the width of the grooves measured at the surface of the tire tread decreases progressively from the groove nearest the midcircumferential plane to the groove nearest a shoulder of a tire.

7. A pneumatic tire according to claim 1 wherein the transverse cross-sectional area of the grooves decreases progressively from the groove nearest the midcircumferential plane to the groove nearest a shoulder of the tire.

8. A pneumatic tire according to claim 1 wherein the grooves constructed with a transverse cross section the area of which is greater in the region near the base than in the region near the tread surface.

9. A pneumatic tire according to claim 1 wherein the groove is provided with a bulbous base.

10. A pneumatic tire according to claim 1 wherein the water flow capacity parameters of the tire tread are arranged to follow a logarithmic progression.

11. A pneumatic tire according to claim 1 wherein the logarithm is to the base 10.

12. A pneumatic tire according to claim 1 wherein each undulating generally circumferential groove has associated with it a series of side grooves extending axially of the groove and joining the groove at the peaks of the undulations.

13. A pneumatic tire according to claim 1 wherein each undulating generally circumferential groove has associated with it a series of side grooves joining the groove at the peaks of the groove the angle of inclination of the side grooves associated with successive grooves to an axial line increasing progressively from the midcircumferential plane of the tire to the shoulder of the tire.

14. A pneumatic tire comprising a tread portion provided with a plurality of generally circumferential undulating grooves and ribs, each groove having substantially the same configuration and depth in which the axial distance between the grooves progressively increases from the grooves nearest to the midcircumferential plane of the tire to the grooves closest to the shoulders of the tire.

15. A pneumatic tire according to claim 14 in which the increase in axial distance between the grooves follows a logarithmic progression.